United States Patent
Kim et al.

(10) Patent No.: US 12,184,207 B2
(45) Date of Patent: Dec. 31, 2024

(54) SENSORLESS INDUCTION MOTOR SYSTEM AND CONTROL METHOD THEREOF

(71) Applicants: Hyundai Motor Company, Seoul (KR); Kia Corporation, Seoul (KR)

(72) Inventors: Sung Do Kim, Seoul (KR); Chang Seok You, Hwaseong-si (KR); Hyo Jeong Lee, Uiwang-si (KR); Min Su Kang, Paju-si (KR); Joo Yeon Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 154 days.

(21) Appl. No.: 17/980,893

(22) Filed: Nov. 4, 2022

(65) Prior Publication Data
US 2023/0402945 A1  Dec. 14, 2023

(30) Foreign Application Priority Data
Jun. 14, 2022  (KR) .................. 10-2022-0072403

(51) Int. Cl.
*H02P 21/18* (2016.01)
*H02K 11/35* (2016.01)

(52) U.S. Cl.
CPC ............. *H02P 21/18* (2016.02); *H02K 11/35* (2016.01)

(58) Field of Classification Search
CPC .. H02P 21/18; H02P 6/18; H02P 6/185; H02P 21/28; H02P 25/026; H02K 11/35
USPC .................. 318/400.02, 400.01, 700
See application file for complete search history.

(56) References Cited

U.S. PATENT DOCUMENTS 9,577,560 B2 *   2/2017   Kobayashi ............. H02P 29/64
9,876,452 B1 *   1/2018   Okubayashi ............. H02P 6/18

FOREIGN PATENT DOCUMENTS

KR   10-2021-0137757 A   11/2021

OTHER PUBLICATIONS

Shin Nakashima, et al. (2000). Sensor-less Initial Rotor Position Estimation of Surface Permanent-Magnet Synchronous Motor. IEEE Transactions On Industry Applications. 36(6):1598-1603.

* cited by examiner

*Primary Examiner* — David Luo
(74) *Attorney, Agent, or Firm* — Morgan, Lewis & Bockius LLP

(57) ABSTRACT

A sensorless induction motor system includes a control unit which applies a plurality of sampling pulse voltages to phases of the stator, estimates the position of a rotor through a first rotor position vector having the greatest deviation in an induced current, compares an induced current deviation of a second rotor position vector having a second greatest deviation of deviation of the induced current with that of a first rotor position vector, and determines whether or not permanent magnets are demagnetized; and a method of controlling the sensorless induction motor system.

16 Claims, 5 Drawing Sheets

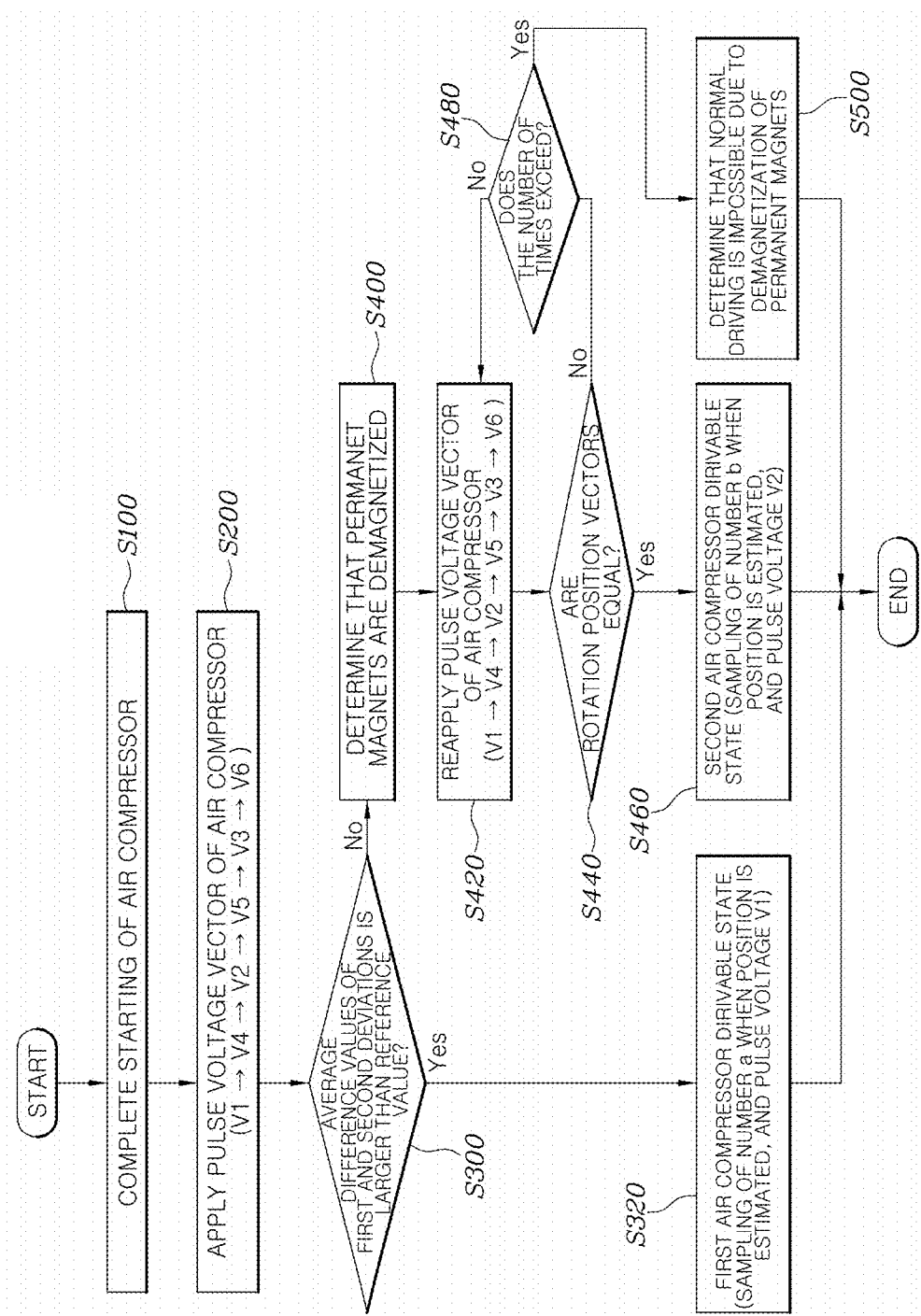

SENSORLESS INDUCTION MOTOR SYSTEM AND CONTROL METHOD THEREOF

CROSS REFERENCE TO RELATED APPLICATION

The present application claims priority to Korean Patent Application No. 10-2022-0072403 filed on Jun. 14, 2022, the entire contents of which is incorporated herein for all purposes by this reference.

BACKGROUND OF THE PRESENT DISCLOSURE

Field of the Present Disclosure

The present disclosure relates to a sensorless induction motor system and a method of controlling the same, determining a position of a rotor about a sensorless induction motor without a sensor, preventing generation of an overcurrent and a control failure caused by incorrect position estimation, to determine whether or not permanent magnets are demagnetized in a relatively easy and exact manner, and continuously effectively measuring the position of the rotor, even when permanent magnets are partially demagnetized.

Description of Related Art

An induction motor is used in various fields, especially in an air compressor of a fuel cell vehicle. An integrated type air compressor, in which an inverter and a motor are combined, may be provided as the air compressor applied to fuel cell systems to reduce a size and weight of an air supply system.

A sensorless control mode in which a Hall sensor is removed and a position of the rotor is estimated may be applied to the integrated type air compressor.

In the related art, relative sizes of induced currents are compared using a hysteresis loop based on magnetic flux density of the permanent magnet in the early stage of a design, and a position to which a vector having the highest value is applied is estimated to be the position of the rotor. A value of residual magnetic flux (λpm), a parameter expressing performance of the permanent magnet motor in the vehicle, can cause permanent deterioration in performance due to heat generation of the permanent magnets and overcurrent, known as irreversible demagnetization. When the hysteresis loop is changed by irreversible demagnetization, an induced current which may be generated when the same pulse vector is applied is reduced, and discrimination when a relative conventional size of the current is reduced leads to a problem in that reliability of the estimation of the position is lowered.

Accordingly, there is a problem in that an incorrect position estimation of the rotor may lead to a resultant sensorless control failure phenomenon.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sensorless induction motor system and a control method therefor, determining a position of a rotor about a sensorless induction motor without a sensor, being able to prevent generation of an overcurrent and a control failure caused by incorrect position estimation, to determine whether or not permanent magnets are demagnetized in a relatively easy and exact way, and continuously effectively measure the position of the rotor even when the permanent magnets are partially demagnetized.

According to one aspect, there is provided a sensorless induction motor system according to an aspect of the present disclosure, including an electric motor including a stator having windings forming a plurality of phases and a rotor having permanent magnets; and a control unit configured to control driving of the electric motor by controlling a voltage applied in each phase of the stator, to apply a plurality of sampling pulse voltages to the phases of the stator, to estimate a position of the rotor through a first rotor position vector having deviation of an induced current, to compare induced current deviation of a second rotor position vector having a second greatest deviation of the induced current with induced current deviation of the first rotor position vector, and to determine whether or not the permanent magnets are demagnetized.

The control unit may estimate the position of the rotor in a state in which starting is completed before driving of the electric motor, and determine whether or not the permanent magnets are demagnetized.

When applying the pulse voltage to the stator in each phase thereof, the control unit may alternately apply the pulse voltage in directions in which magnetic fields are offset from each other.

When the position estimation of the rotor is performed a plurality of times, and when an average between an induced current deviation of the first rotor position vector and an induced current deviation of the second rotor position vector derived whenever the position estimation is performed is less than a reference value, it may be determined that the permanent magnets are demagnetized.

The control unit may increase a magnitude and an amount of the voltage when it is determined that the permanent magnets are demagnetized, and apply the secondary sampling pulse voltages.

The control unit may apply the secondary sampling pulse voltage a plurality of times, and the rotor position vector having a greatest deviation of the induced current is equally detected, the control unit may estimate the position of the rotor using a corresponding position vector.

The control unit may apply the secondary sampling pulse voltage a plurality of times, and may output a failure signal when the rotor position vector having the greatest deviation of the induced current is not equally detected.

According to various aspects of the present disclosure, there is provided a method of controlling a sensorless induction motor system, including: an electric motor including a stator having windings forming a plurality of phases and a rotor having permanent magnets, and a control unit for controlling driving of the electric motor by controlling a voltage applied to the stator in each phase thereof, the method including: applying a plurality of sampling pulse voltages to the stator in respective phases thereof, and estimating a position of the rotor through a first rotor position vector having the greatest deviation of an induced current; and comparing an induced current deviation of a second rotor position vector having a second greatest deviation of the induced current with an induced current deviation of the first rotor position vector, and determining whether or not the permanent magnets are demagnetized.

When applying the pulse voltage to the stator in each phase thereof, the control unit may alternately apply the pulse voltage in directions in which magnetic fields are offset from each other.

The method may further include, after determining whether or not the permanent magnets are demagnetized, increasing, with the control unit, a magnitude and a frequency of the voltage applied when it is determined that the permanent magnet is demagnetized, and applying the secondary sampling pulse voltages.

The method may further include, with the control unit, after applying the secondary sampling pulse voltages, estimating the position of the rotor using the corresponding position vector when the rotor position vector having the greatest deviation of the induced current caused by the application of the secondary sampling pulse voltages in a plurality of times is equally detected.

According to the sensorless induction motor system and the control method therefor, it is possible to determine a position of a rotor about a sensorless induction motor without a sensor, to be configured to prevent generation of an overcurrent and a control failure caused by incorrect position estimation, to determine whether or not permanent magnets are demagnetized in a relatively easy and exact way, and continuously effectively measure the position of the rotor even when the permanent magnets are demagnetized in part.

It will be appreciated by those skilled in the art that the effects that may be achieved with the present disclosure are not limited to those described above and other advantages of the present disclosure will be clearly understood from the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is a flow chart illustrating the method of controlling the sensorless induction motor system according to an exemplary embodiment of the present disclosure.

Figure 1:
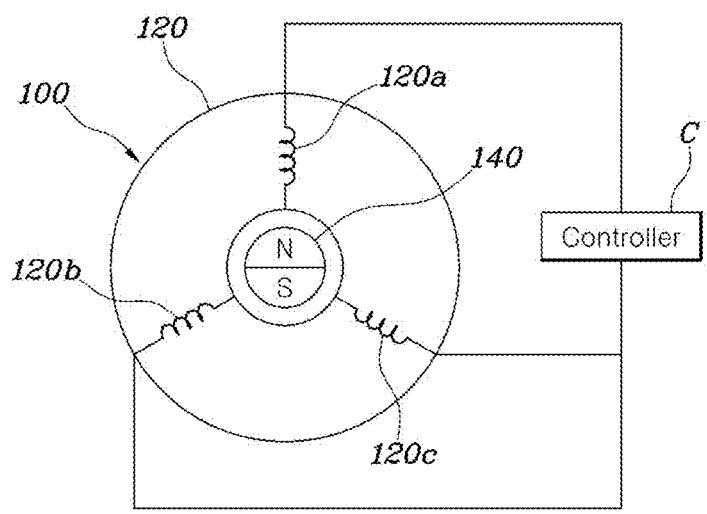
FIG. 1 is a schematic configuration view of a sensorless induction motor system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural and functional descriptions of the embodiments of the present disclosure included in the present disclosure or application are illustrative only for describing the embodiments according to an exemplary embodiment of the present disclosure, and the exemplary embodiments of the present disclosure may be implemented in various forms and should not be construed as being limited to exemplary embodiments described in the present disclosure or application.

The exemplary embodiments of the present disclosure may be variously modified and may have various forms, so that specific embodiments will be illustrated in the drawings and described in detail in the present disclosure or application. It should be understood, however, that it is not intended to limit the embodiments according to the concept of the present disclosure to specific disclosure forms, but to include all modifications, equivalents, and alternatives falling within the spirit and scope of the present disclosure.

The terms first, second, and the like may be used to describe various components, but the components should not be limited by these terms. These terms may be used only for distinguishing one component from another component, and for example, a first component may be referred to as a second component, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the other hand, when a component is referred to as being "directly connected" or "directly coupled" to another component, it should be understood that yet another component may not be present between the component and another component. Other expressions describing the relationship between components, that is, "between" and "immediately between," or "adjacent to" and "directly adjacent to" should also be construed as described above.

The terms used herein are for describing only specific embodiments and are not intended to limit the present disclosure. Unless the context clearly dictates otherwise, the singular form includes the plural form. In the present disclosure, it should be construed that the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skilled in the art to which the present disclosure pertains. General terms that are defined in a dictionary shall be construed as having meanings that are consistent in the context of the relevant art, and will not be interpreted as having an idealistic or excessively formalistic meaning unless clearly defined in the present disclosure.

A control portion (controller) according to an exemplary embodiment of the present disclosure may be implemented through an algorithm configured to control operations of various components of the vehicle, a non-volatile memory configured to store data relating to software commands to reproduce the algorithm, or a processor configured to perform operations, which will be described below, using data stored in a corresponding memory. Here, the memory and the processor may be implemented as separate chips. Alternatively, the memory and the processor may be implemented as a single chip in which the memory and the processor are integrated. The processor may be in a form of one or more processors.

Hereinafter, a sensorless induction motor system according to exemplary embodiments of the present disclosure will be described with reference to the accompanying drawings.

Figure 2:
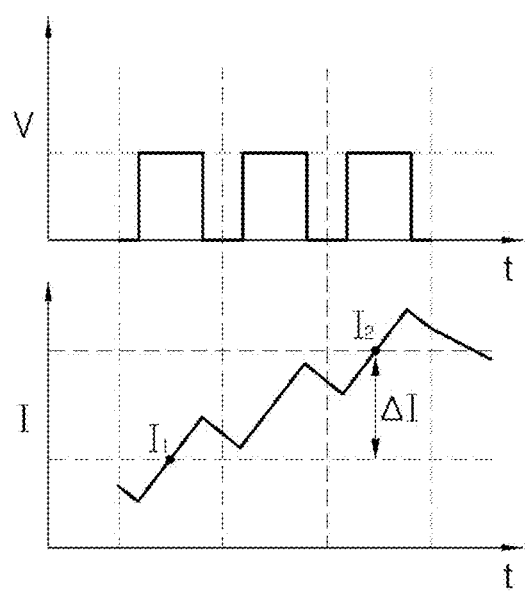
FIG. 2, FIG. 3 and FIG. 4 are graphs illustrating the sensorless induction motor system according to an exemplary embodiment of the present disclosure, and a control method therefor.
Figure 3:
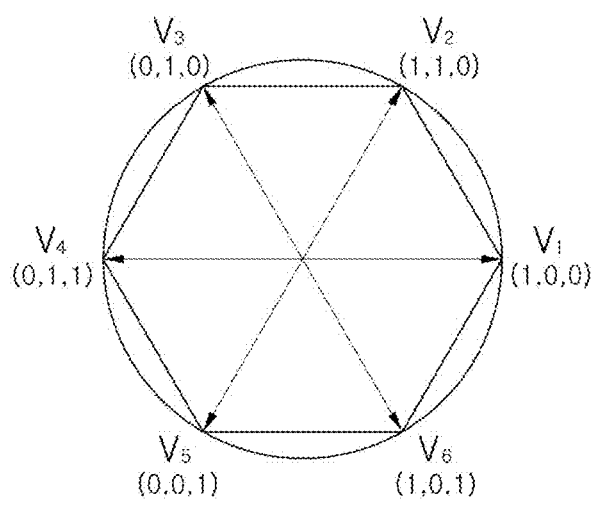
Figure 4:
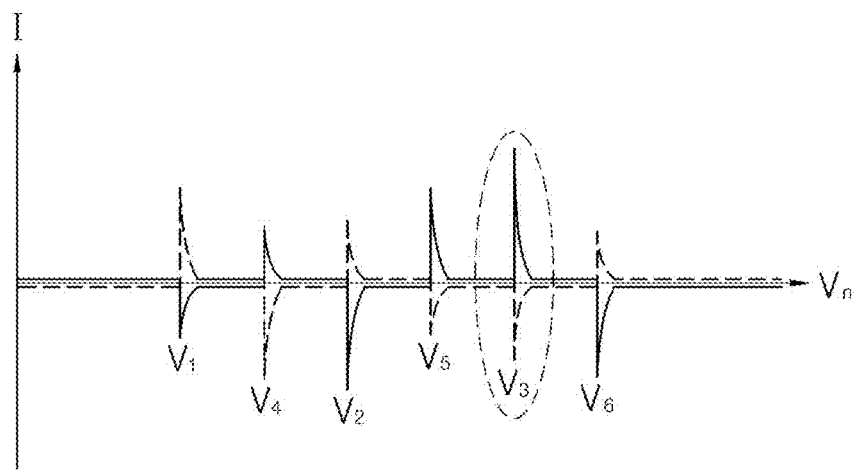

FIG. 1 is a schematic configuration view of a sensorless induction motor system according to an exemplary embodiment of the present disclosure. FIG. 2, FIG. 3 and FIG. 4 are graphs of the sensorless induction motor system according to an exemplary embodiment of the present disclosure, and a control method therefor. FIG. 5 is a flow chart illustrating the method of controlling the sensorless induction motor system according to an exemplary embodiment of the present disclosure.

FIG. 1 is a schematic configuration view of a sensorless induction motor system according to an exemplary embodiment of the present disclosure, and the sensorless induction motor system according to an exemplary embodiment of the present disclosure includes: an electric motor 100 including a stator 120 provided with a winding including a plurality of phases 120a, 120b, and 120c, and a rotor 140 provided with permanent magnets; and a control unit C controlling driving of the electric motor by controlling a voltage applied in each phase of the stator, applying a plurality of sampling pulse voltages to the stator in each phase thereof, estimating a position of the rotor through a first rotor position vector having a greatest deviation of the induced current, comparing the induced current deviation of a second rotor position vector having a second greatest deviation of the induced current with an induced current deviation of the first rotor position vector, and determining whether or not the permanent magnets are demagnetized.

The induction motor of the present disclosure may be used in various fields, and an air compressor of a fuel cell system may be provided as a representative example. Therefore, the induction motor applied to the air compressor will be described below as an exemplary embodiment of the present disclosure.

Furthermore, the control unit according to an exemplary embodiment of the present disclosure may be implemented through a non-volatile memory configured to store an algorithm configured to control motions of various constituent elements of the vehicle or which is configured to store data related to software commands regenerating the algorithm, and a processor configured to conduct motions to be described below using the data stored in the memory of interest. Here, the memory and the processor may be implemented by individual chips. Alternatively, the memory and the processor may be implemented by a signal chip so that they are integrated with each other, and the processor may take a type of one or more processors.

The induction motor 100 of the present disclosure includes a stator 120 and a rotor 140, wherein the stator is provided with a winding constituting a plurality of phases, and the rotor is provided with permanent magnets. As an exemplary embodiment of the present disclosure, the stator may be configured for three phases of a U phase 120a, a V phase 120b, and a W phase 120c, and each phase is provided with the winding. The permanent magnets of the rotor 140 are provided with an N pole and an S pole.

The control unit C is configured to control a voltage applied to each phase, being able to drive or stop the rotor of the electric motor, or to control a rotation speed of the rotor.

The induction motor generally makes use of sensors including the Hall sensor to identify the speed of the rotor and precisely detect a position of the rotor. However, the present disclosure relates to an induction motor that identifies a position and a speed of the rotor of an induction electric motor without sensors. Moreover, as an exemplary embodiment of the present disclosure, in a case of the sensorless induction motor of the present disclosure, a rotor position estimation principle based on a counter electromotive force may be applied.

A surface mounted permanent magnet synchronous motor (SMPMSM) based on a sensorless control mode without a position sensor cannot estimate an initial position of a rotor in a state in which any motor is not driven. A method of controlling an initial position estimation of a motor without saliency of the rotor makes use of characteristics of a hysteresis loop according to the magnetic flux density.

As the N poles of the rotor are closer to the stator, the magnetic flux density is high. As the N poles of the rotor are more distant from the stator, the magnetic flux density is low. A shape of the hysteresis loop gets thicker as the magnetic flux density becomes high, and a non-linear section caused by magnetic saturation is increased. Therefore, using the fact that there occurs a difference between induced currents generated when a hysteresis loop characteristic applies a pulse voltage to each phase according to the magnetic flux density, a position of the stator at which the highest induced current occurs is determined to be nearest the N pole of the rotor, and is estimated.

However, when the demagnetization of the permanent magnets occurs, there may be exhibited a characteristic in that the magnetic flux density of the permanent magnets is reduced, a shape of the hysteresis loop is thinned, and a linear section is increased. When the hysteresis loop is changed by the irreversible demagnetization, the induced current which may be generated when the same pulse vector is applied is reduced, and the discrimination is reduced when relative magnitudes of the currents are compared, so that reliability in the position estimation may be lowered.

The present disclosure suggests a plan of diagnosing generation of irreversible demagnetization of the permanent magnet when the irreversible demagnetization is generated in a pulse voltage application mode in which the position of the rotor of the air compressor motor based on the sensorless control mode, and a plan configured for securing reliability of the position estimation depending on a degree of the demagnetization.

To the present end, the present disclosure compares relative magnitudes of the induced currents according to each phase of a pulse voltage application vector based on the position estimation of the rotor, compares magnitudes of two current differences of a vector exhibiting a greatest current difference and a vector exhibiting the next great current difference, it is determined that, when the difference is less than a fixed value, a significant difference with the hysteresis loop in a design early stage is generated to intend to diagnose the permanent magnet demagnetization. Furthermore, through control of increasing the pulse voltage magnitude and increasing the number of times pulse sampling is undertaken, it is possible to secure discrimination of induced current magnitude comparison, secure reliability of the position estimation, and to secure service safety.

FIG. 2, FIG. 3 and FIG. 4 are graphs illustrating the sensorless induction motor system according to various exemplary embodiments of the present disclosure, and a control method therefor. To be specific, the control unit is configured to apply a plurality of sampling pulse voltages to the stator in each phase thereof.

First, to determine a position of the rotor, a pulse voltage should be applied to the stator in each phase thereof, and deviations of induced currents should be compared. Because a phase including a greatest deviation between the induced currents should be found, sampling of highlighting variation of the current is selected, and increments of the currents are compared. However, when the magnitude of the induced current is small, the deviation in the current between the phases is uncertain, whereas, when the magnitude of the induced current is large, reverse rotation of the motor at rest can caused. Thus, a magnitude of a constant voltage and a limit of the number of times sampling is undertaken should be selected through a test.

FIG. 2 is a graph illustratively exhibiting the present process. As in FIG. 2, when a pulse voltage is applied, the resultant induced current is observed as in FIG. 2, and in the observed induced current, a deviation ΔI between the minimum value I1 and the maximum value I2 is derived. Here, a position indicating the greatest magnitude ΔI among a plurality of deviations ΔI derived at the respective phases may be estimated to a position of the N pole.

Based on the present principle, an order of applying the pulse voltage will be described in a case of a three-phase induction motor. FIG. 3 illustrates voltage vectors illustrating an order of applying the pulse voltage, wherein the voltage vectors in the three-phase induction motor may be represented as V1, V2, V3, V4, V5, and V6 in the counter clockwise direction as illustrated. Moreover, to have no influence on the air compressor rotor during a stop, a voltage is applied in a direction in which the rotor is stopped and rotated and in a direction in which a magnetic field generated by application of the pulse voltage is offset. Thus, in the shown example, the voltage may be applied in the order of V1-V4-V2-V5-V3-V6.

As a result of applying the pulse voltage in such a manner, a result of generating the induced current as in FIG. 4 may be obtained. FIG. 4 shows an induced current generated when the pulse voltage is applied in the order of V1-V4-V2-V5-V3-V6, and shows that a position at which a deviation between the minimum value and the maximum value of the induced current is greatest is V3, and the N pole is located in a position of 120 degrees. That is, the control unit is designed to alternately apply the pulse voltage a plurality of times in directions in which magnetic fields are offset when the pulse voltage is applied to the stator in each phase thereof. As a result, a position of the phase at which the deviation of the induced current is greatest may be determined to be a position of the rotor.

That is, the position of the rotor is estimated through the first rotor position vector at which the deviation of the induced current is greatest. Here, an induced current deviation of the second rotor position vector having a second greatest deviation of the induced current is compared with that of the first rotor position vector having the greatest deviation, and thereby it is determined whether or not the permanent magnet is demagnetized.

To be specific, the control unit conducts the position estimation of the rotor in a plurality of times. Moreover, difference values between the induced current deviation of the first rotor position vector and the induced current deviation of the second rotor position vector, and are derived at every time of the position estimation, are derived. Here, an average of the derived difference values is found, and when the found average is less than a reference value, it may be determined that the permanent magnets are demagnetized.

Meanwhile, when the control unit determines that the permanent magnets are demagnetized, the control unit increases the magnitude and the number of times the voltage is applied, and can apply a secondary sampling pulse voltage. Thus, the control unit is configured to apply the secondary sampling pulse voltage a plurality number of times, and when the rotor position vectors in which the deviation of the induced current is greatest are equally detected, the control unit can estimate the position of the rotor using the position vector of interest.

Furthermore, the control unit is configured to apply the secondary sampling pulse voltage a plurality number of times, and when the rotor position vectors in which the deviation of the induced current is greatest are not equally detected, the control unit can output a failure signal.

FIG. 5 is a flow chart illustrating the method of controlling the sensorless induction motor system according to various exemplary embodiments of the present disclosure. First, the control unit is configured to estimate a position of the rotor in a state in which starting is completed before the electric motor is driven, and can determine whether or not the permanent magnets are demagnetized (S100). That is, the position of the rotor is estimated in a state in which the electric motor is stopped, intended to prevent a control error from being generated during the driving of the electric motor, and to inspect an exact position estimation possibility of the rotor before the electric motor is driven, and a driving possibility of the electric motor.

Hereinafter, the control unit is configured to perform applying a plurality of sampling pulse voltages to the stator in each phase thereof, and estimating the position of the rotor through the first rotor position vector having the greatest deviation of the induced current (S200). When applying the pulse voltage to the stator in each phase thereof, the control unit can alternately apply the pulse voltage in directions in which magnetic fields are offset from each other. Therethrough, the rotor is allowed to maintain a stopped state without causing rotation.

The control unit is configured to apply a plurality of sampling pulse voltages to each phase, and the control unit measures induced currents based on the application of the pulse voltages. As a result of the measurement a plurality number of times, the rotor position vector in which a deviation of the measured induced current is greatest is defined as the first rotor position vector, and a present position of the rotor is estimated through a direction of the vector.

Furthermore, the control unit defines a position vector having the second greatest deviation of the induced current as the second rotor position vector. The second rotor position vector is not directly used for the position estimation of the rotor, but is used to determine whether or not the rotor permanent magnets are demagnetized through comparison with the first rotor position vector.

The controller unit is configured to compare apparatus unit is configured to compare the induced current deviation of the first rotor position vector with the induced current deviation of the second rotor position vector having the second greatest deviation of the induced current, and determines whether or not the permanent magnets are demagnetized (S300).

To be specific, the control unit is configured to perform the position estimation of the rotor a plurality number of times, and found difference values between the induced current deviation of the first rotor position vector and the induced current deviation of the second rotor position vector, which are derived at every time of the position estimation. Here, the control unit is configured to determine an average of the difference values. When the determined average is less than a reference value, the control unit can determine that the permanent magnets are demagnetized. When the induced current deviation of the first rotor position vector and the induced current deviation of the second rotor position vector do not show a great difference therebetween, this is because it may be seen that the permanent magnets are demagnetized.

Meanwhile, if the average is equal to or greater than the reference value, the rotor is determined to be normal. Hereinafter, at the time of the position estimation of the rotor, the number of times being sampled (a times) and the pulse voltage V1 are reused without a change.

When the control unit determines that the permanent magnets are demagnetized, the control unit increases the magnitude and the number of times of the applied voltage, and can apply a secondary sampling pulse voltage (S400 and S420). In the instant case, the number of times being sampled a2 will be more than the existing one a1, the applied pulse voltage V2 is also set to a value some greater than V1.

Furthermore, after applying the secondary sampling pulse voltages, and when the rotor position vector including the greatest deviation of the induced current is greatest is equally detected due to the application of the secondary sampling pulse voltages in a plurality of times, the control unit is configured to estimate the position of the rotor using the corresponding position vector (S440).

That is, despite applying the pulse voltage in a plurality of times, when the rotor position vector having the greatest deviation of the induced current is greatest is equally detected, the control unit, it is understood that the permanent magnet is demagnetized, but there is no problem in determining the position of the rotor, and afterwards, it is set to store and use the number of a sampling frequency a2 and a pulse voltage V2 in a memory (S460) to determine the position of the rotor.

Meanwhile, when the rotor position vectors, in which the deviation between the induced currents caused by applying the pulse voltage a plurality of times is greatest, are not equal to each other, redetection is performed in the limited number of frequencies (S480). When the rotor position vectors are constantly derived after being redetected, it is regarded that the demagnetization of the permanent magnets is very seriously generated (S500). In the instant case, maintenance of the electric motor is required. Thus, a failure signal is output without permitting driving of the vehicle, a user is guided to receive maintenance of the vehicle.

According to the sensorless induction motor system of the present disclosure and the control method therefor, a position of the rotor of the sensorless induction motor is determined without a sensor. Accordingly, it is possible to prevent occurrence of the overcurrent caused by incorrect position estimation and a control failure, to determine whether or not the permanent magnet is demagnetized in a relatively easy and exact way, and to continuously and effectively measure the position of the rotor even if the permanent magnet is partially demagnetized.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sensorless induction motor system comprising:
an electric motor including a stator having windings forming a plurality of phases and a rotor having permanent magnets; and
a control unit configured to control driving of the electric motor by controlling a voltage applied in each phase of the stator, to apply a plurality of sampling pulse voltages to the phases of the stator, to estimate a position of the rotor through a first rotor position vector having a greatest deviation of an induced current, to compare induced current deviation of a second rotor position vector having a second greatest deviation of the induced current with induced current deviation of the first rotor position vector, and to determine whether or not the permanent magnets are demagnetized.

2. The sensorless induction motor system of claim 1, wherein the control unit is configured to estimate the position of the rotor in a state in which starting is completed before driving of the electric motor, and to determine whether or not the permanent magnets are demagnetized.

3. The sensorless induction motor system of claim 1, wherein, when applying the pulse voltages to the stator in each phase thereof, the control unit allows the pulse voltages to be alternately applied in directions in which magnetic fields are offset from each other.

4. The sensorless induction motor system of claim 1, wherein, when the sampling pulse voltages are applied to the respective phases of the stator, the control unit is configured to apply a constant level of voltage in a plurality of times, to estimate the position of the rotor, and to determine whether or not the permanent magnets are demagnetized.

5. The sensorless induction motor system of claim 4, wherein the control unit is configured to perform position estimation of the rotor a plurality of times, and to conclude that the permanent magnets are demagnetized when an average of difference values between the induced current deviation of the first rotor position vector derived whenever the position is estimated and the induced current deviation of the second rotor position vector.

6. The sensorless induction motor system of claim 5, wherein the control unit is configured to apply secondary sampling pulse voltages after increasing a magnitude and frequency of the voltage applied when the permanent magnets are demagnetized.

7. The sensorless induction motor system of claim 6, wherein, when the secondary sampling pulse voltages are applied and a rotor position vector having a greatest deviation of the induced current is equally detected, the position of the rotor is estimated by a corresponding position vector.

8. The sensorless induction motor system of claim 7, wherein the controller is configured to output a failure signal when the secondary sampling pulse voltages are applied a plurality of times and when rotor position vectors in which the deviation of the induced current is greatest are not equally detected, the control unit outputs a failure signal.

9. A method of controlling a sensorless induction motor system including an electric motor, which includes a stator having windings forming a plurality of phases and a rotor having permanent magnets, and a control unit for controlling driving of the electric motor by controlling a voltage applied to the stator in each phase thereof, the method comprising:
applying, by the control unit, a plurality of sampling pulse voltages to the stator in respective phases thereof, and estimating a position of the rotor through a first rotor position vector having a greatest deviation of an induced current; and
comparing, by the control unit, an induced current deviation of a second rotor position vector having a second greatest deviation of the induced current with an induced current deviation of the first rotor position vector, and determining whether or not the permanent magnets are demagnetized.

10. The method of claim 9, wherein the control unit alternately applies the pulse voltages to be in directions in which magnetic fields are offset from each other when the pulse voltages are applied to the stator in each phase thereof.

11. The method of claim 9, wherein, in determining whether or not the permanent magnets are demagnetized, the control unit is configured to perform position estimation of the rotor in a plurality of times, and to determine that the permanent magnets are magnetized when an average of difference values between deviation of the induced current of the first rotor position vector and deviation of the induced current of the second rotor position vector is less than a reference value.

12. The method of claim 11, further including, after determining whether or not the permanent magnets are demagnetized, increasing, with the control unit, a magnitude and a frequency of the voltage applied when the control unit concludes that the permanent magnet is demagnetized, and applying secondary sampling pulse voltages.

13. The method of claim 12, further including: after applying the secondary sampling pulse voltages, estimating, by the control unit, the position of the rotor using a corresponding position vector when a rotor position vector having a greatest deviation of the induced current caused by the application of the secondary sampling pulse voltages in a plurality of times is equally detected.

14. The method of claim 13, wherein the controller is configured to output a failure signal when the secondary sampling pulse voltages are applied the plurality of times and when rotor position vectors in which the deviation of the induced current is greatest are not equally detected, the control unit outputs a failure signal.

15. The method of claim 9, wherein the control unit is configured to estimate the position of the rotor in a state in which starting is completed before driving of the electric motor, and to determine whether or not the permanent magnets are demagnetized.

16. The method of claim 9, wherein, when the sampling pulse voltages are applied to the respective phases of the stator, the control unit is configured to apply a constant level of voltage in a plurality of times, to estimate the position of the rotor, and to determine whether or not the permanent magnets are demagnetized.

\* \* \* \* \*